(12) United States Patent
Angquist

(10) Patent No.: US 6,559,561 B1
(45) Date of Patent: May 6, 2003

(54) METHOD AND A DEVICE FOR DAMPING POWER OSCILLATIONS IN TRANSMISSION LINES

(75) Inventor: Lennart Angquist, Enkoping (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/700,982

(22) PCT Filed: Mar. 20, 2000

(86) PCT No.: PCT/SE00/00543

§ 371 (c)(1),
(2), (4) Date: Dec. 15, 2000

(87) PCT Pub. No.: WO00/57529

PCT Pub. Date: Sep. 28, 2000

(30) Foreign Application Priority Data

Mar. 22, 1999 (SE) .............................................. 9901015

(51) Int. Cl.$^7$ ................................................. H02J 1/02
(52) U.S. Cl. ....................................... 307/105; 307/102
(58) Field of Search ........................ 333/17.2; 318/147; 322/58; 307/102, 105

(56) References Cited

U.S. PATENT DOCUMENTS

| 5,227,713 A | 7/1993 | Bowler et al. ................ 322/58 |
| 5,625,277 A | 4/1997 | Khan et al. ................... 322/58 |
| 5,642,007 A * | 6/1997 | Gyugyi et al. .............. 307/102 |
| 5,909,105 A * | 6/1999 | Noroozian ................... 307/105 |
| 5,977,731 A | 11/1999 | Xia et al. ..................... 318/147 |

FOREIGN PATENT DOCUMENTS

WO    WO 97/26696    7/1997

\* cited by examiner

*Primary Examiner*—Brian Sircus
*Assistant Examiner*—Sharon A. Polk
(74) *Attorney, Agent, or Firm*—Oblon, Spivak, McClelland, Maier & Neustadt, P.C.

(57) ABSTRACT

In a method for damping power oscillations in a transmission line, at least one first angular-frequency signal is generated, representing a first angular frequency which is given by a prior knowledge of oscillation frequencies expected in the power system, and a first phase-reference signal is formed as the time integral of the angular-frequency signal. A power quantity in the transmission line characterizing the power is sensed and a first estimated power quantity is formed, representing for an oscillation of the first angular frequency, its amplitude and phase position relative to the first phase-reference signal. A first damping signal is formed with an amplitude dependent on the amplitude of the first estimated power quantity and with a first phase shift in relation to the phase position thereof, and the first damping signal is supplied to an actuator for influencing the power transmitted in the transmission line.

28 Claims, 9 Drawing Sheets

METHOD AND A DEVICE FOR DAMPING POWER OSCILLATIONS IN TRANSMISSION LINES

TECHNICAL FIELD

The present invention relates to a method for damping power oscillations in transmission lines, and to a device for carrying out the method.

The device comprises means for forming a damping signal in dependence on the amplitude of an estimated power quantity and with an eligible phase shift in relation to the phase position thereof, and an actuator to be influenced in dependence on the damping signal and hence to influence the power transmitted in the transmission line

BACKGROUND ART

In transmission lines, which connect two separate power networks or which connect two parts in one and the same power network, a constant phase-angle difference is maintained, during steady state at a certain transmitted power, between the voltages at the end points of the transmission line. Each change of the transmitted power entails a change of this angular difference. Because of the moments of inertia of the generators in the power network(s), each such change of the angular difference occurs in an oscillating manner with natural frequencies typically in the interval of 0.1 to 2 Hz. The internal damping of these power oscillations is often very small, and, in addition, decreases with increasing amplitude of the oscillation. If the amplitude of the oscillation is sufficiently great, the internal damping may even become negative, in which case the oscillation amplitude grows in an uncontrolled manner such that the transmission of power via the transmission line has to be interrupted.

Especially great power oscillations may occur upon a rapid disconnection of generators or in connection with lines in the power system being disconnected, for example in connection with short circuits on the transmission line or in some of the connected power systems.

FIG. 1 shows a typical appearance of a disturbance in the active power in a transmission line included in a power system, for example in case of a loss of a generator which is connected to and feeds power into the power system. The time t is plotted on the horizontal axis and the instantaneous active power p(t) is plotted on the vertical axis. In a given time interval, the disturbance may be characterized by a mean power $P_{av}$ and an oscillating component $\Delta p(t)$, the latter having an angular frequency $\Omega = 2\pi f$. As mentioned above, the frequency f usually lies within the interval 0.1 to 2 Hz.

The damping of the power oscillations may be improved by influencing the power transmitted by the transmission line. In a known way, this influence may, for example, be achieved:

by influencing the terminal voltage of a generator connected to the power network(s) by means of a so-called Power System Stabilizer (PSS), which influences the magnetization equipment for the generator and hence the terminal voltage thereof, by influencing the total reactance of the transmission line by means of a controllable series capacitor connected into the line, a so-called Thyristor Controlled Series Capacitor (TCSC), in which case thus the total reactance of the transmission line consists of the line reactance plus the reactance of the series capacitor, or by supplying/consuming reactive power at some point on the transmission line by means of a so-called reactive-power compensator (Static Var Compensator, SVC), which influences the voltage at that point on the fine where the compensator is connected and hence also the power flow in the transmission line.

The generator, the controllable series capacitor, and the reactive-power compensator, respectively, constitute actuators which modulate each of the above-mentioned quantities, the terminal voltage of the generator, the total reactance of the transmission line, the voltage at a certain point along the line, such that, in addition to the original power oscillation, an additional controlled power variation is achieved. If this controlled power variation is carried out with the same frequency as the original oscillation and with a phase position which deviates 90° from the phase position thereof, a damping of the original oscillation is obtained.

In order not to burden the representation with distinctions which are self-explanatory to the person skilled in the art, in the following description the same designations are generally used for quantities which occur in the installation as for the measured values and signals/calculating values, corresponding to these quantities, which are supplied to and processed in the control equipment which will be described in the following.

FIG. 2 schematically shows a known embodiment of damping equipment by means of a Power System Stabilizer (PSS). A generator 1 is connected, via a power transformer T1, to a transmission line 2, which in turn is connected to a power network N2 with an additional line 3 (only roughly indicated). The generator has magnetization equipment 1a. The voltage V and the current I through the transmission line are sensed by means of a voltage transformer T2 and a current-measuring device IM, respectively. A voltage controller 4, only symbolically shown, is supplied with a voltage-reference signal $V_{REF}$ and a measured value $V_{SVAR}$ of the actual value of the voltage V, which measured value is obtained via the voltage transformer T2. The output signal from the voltage controller is supplied to the magnetization equipment of the generator and influences its excitation current in such a way that the measured value $V_{SVAR}$ approaches the voltage-reference signal $V_{REF}$ to correspond thereto at least under steady-state conditions.

A power-calculating member 5 is supplied with the measured value $V_{SVAR}$ and with a measured value i(t) of the actual value of the current I and calculates therefrom a calculating value p(t) of the active power delivered to the power network N2 by the generator. This calculating value is supplied to an identification member 6 for identification of the amplitude and the phase position of a power oscillation, if any. The identification member forms from the calculating value p(t) a control signal $\Delta V_{PSS}$ which is supplied to the voltage controller of the generator as an addition in addition to the normal voltage reference $V_{REF}$. Since the power oscillation in the transmission line also occurs in the power delivered by the generator, in this way also a damping of the power oscillation in the transmission line may be achieved.

A known embodiment of the identification member 6 is illustrated in FIG. 4. The calculating value p(t) is supplied to a so-called washout filter 61 with a transfer function $$\frac{sT_w}{1+sT_w},$$

where s is the Laplace operator. The filter separates the constant or slowly varying component $P_{av}$ of the calculating value p(t) but forwards the oscillating part thereof. The filter has a cutoff frequency $$\frac{1}{2\pi T_w}$$

chosen with a sufficient distance from the frequency of the oscillation which is to be damped.

The above-mentioned desired phase shift of 90° of the oscillating part of the calculating value p(t) is achieved with the aid of one or more lead-lag filters, in this embodiment by means of two cascade-connected filters 62 and 63 with the transfer functions $$\frac{1+sT_1}{1+sT_2}$$

and $$\frac{1+sT_3}{1+sT_4},$$

respectively.

The output signal D(t) from the lead-lag filter 63 constitutes a damping signal which, after a necessary adaptation (not shown in the figure) of the signal level to constitute the control signal $\Delta V_{PSS}$, is utilized for modulating the terminal voltage of the generator, thus achieving the desired controlled power variation.

Because of limitations of the available control range of the actuators (limited by the maximum stresses which the apparatus may endure), limitations (only roughly indicated in the figure) of the output signals from the lead-lag filters are introduced.

These limitations have an adverse effect on the efficiency of the damping equipment in that the effective amplification at large signals is reduced below the nominal amplification at small oscillating amplitudes when the limitations are not active.

Experience shows that, in case of disturbances of the power systems, a change of the mean power on the transmission line is obtained, almost without exception, at the same time as the oscillation is initiated. This is illustrated in FIG. 1 which also shows how the original power is slowly stabilized at a new level. This return is controlled by overriding control systems in the power system and has a negligible effect on the power oscillation. However, a further problem is that the fast change of the mean power which occurs when a power oscillation starts (see FIG. 1) causes an undesired transient contribution to the output signal from the washout filter. This contribution tends to make the total output signal from the filter so large as to exceed the available control range of the actuators. To counteract this, limitations in the lead-lag filters, according to some so-called non-integral windup strategy, are introduced. A negative consequence of this process, however, is that the maintenance of the desired phase shift in the lead-lag filters is rendered difficult.

In a power system with more than two generators, several oscillation modes with different frequencies occur, in which different groups of generators oscillate between themselves. This causes damping equipment, the control equipment of which is based on the prior art according to FIG. 4, to react on the different oscillation modes, a consequence of which may be that oscillation modes, which per se have an acceptable internal damping, may be disturbed by action from the damping equipment.

FIG. 3 schematically shows a known embodiment of damping equipment in which the actuator is in the form of a controllable series capacitor (TCSC) A generator G1 is connected, via a power transformer T1, to a power network N1, and a generator G2 is connected, via a power transformer T3, to a power network N2. The power networks are interconnected by means of at least one transmission line 2, into which a controllable series capacitor 7 is connected. It is assumed in the following that the controllable series capacitor, in a manner known per se, is controlled by a reactance regulator 8 via a reference value $X_{REF}$ for its reactance.

A power-calculating member 5 calculates, in a manner similar to that described with reference to FIG. 2, a calculating value p(t) of the active power transmitted by the transmission line. The calculating value is supplied to a reactance calculating member 9 which comprises washout and lead-lag filters, as described with reference to FIG. 4, as well as an adaptation (not shown in the figure) of the damping signal D(t) to constitute a correction value $\Delta X_{POD}$. This correction value is supplied, together with the reference value $X_{REF}$ for the reactance of the series capacitor, to a summing member 10, the output signal of which is supplied to the reactance regulator 8 to achieve the desired controlled power variation.

FIG. 9A schematically shows a known embodiment of damping equipment in which the actuator is in the form of a reactive-power compensator (SVC), and in which corresponding parts of the figure, and, where applicable, corresponding quantities, have been given the same reference numerals as in FIG. 3. A reactive-power compensator 7' is connected in shunt connection to the transmission line 2 at a connection point J1. The impedance of the transmission line between the connection point and the power networks N1 and N2 are marked in the figure as line reactances LR1 and LR2, respectively. The compensator is adapted, in a manner known per se, to influence the voltage V at the connection point J1 via a voltage regulator 8' which, as output signal, forms and supplies to the compensator a reference value B(t) for its susceptance.

A difference-forming member 4' is supplied and forms as output signal the difference of a voltage-reference value $V_{REF}$ and a measured value $V_{SVAR}$ obtained via the voltage transformer T2, of the actual value of the voltage V, which output signal is supplied to the voltage controller.

The calculating value p(t) is supplied to a calculating member 9' which comprises washout and lead-lag filters as described with reference to FIG. 4, and an adaptation (not shown in the figure) of the damping signal D(t) to constitute a correction value $\Delta U(t)$. This correction value is supplied to the difference-forming member 4' as an addition to the voltage-reference value $V_{REF}$. The reference value B(t) for the susceptance of the compensator is thus formed in dependence on the correction value $\Delta U(t)$.

When the voltage at the connection point J1 varies (in dependence on the correction value $\Delta B(t)$), also the active power flow in the transmission line will be influenced. It is to be noted that the relation between the voltage variation and the power variation depends on the location of the compensator along the transmission line as well as on the voltage characteristic for the load placed at the receiving end of the line, in the figure marked as a load L connected to the power network N2. An increase of the voltage at the connection point J1 usually leads to an increase of the transmitted active power, which relieves the generator G2. In the event that the compensator (in this example) is connected near the power network N2 and, in addition, the load L is of a certain magnitude and/or is greatly dependent on the voltage, it may, however, happen that a voltage increase at the connection point J1 leads to such a large power increase in the load L that the load on the generator G2 instead increases. Under these circumstances, a reversal of the signs of correction values ΔU(t) to the reference value of the voltage controller must thus take place in order for a correct damping of the power oscillations to be obtained.

SUMMARY OF THE INVENTION

The object of the invention is to achieve a method of the kind described in the introduction, which permits a fast and robust identification of a component of the power oscillation, oscillating with a given angular frequency, without the identification being disturbed by the simultaneously occurring change of the mean power and of oscillations with deviating angular frequencies, and to a device for carrying out the method.

According to the invention, this is achieved by generating at least one first angular-frequency signal, representing a first angular frequency which is given by a priori knowledge of oscillation frequencies expected in the power system, forming a first phase-reference signal as the time integral of the first angular-frequency signal, sensing a power quantity characterizing for the power transmitted by the transmission line, forming a first estimated power quantity in dependence on the characterizing power quantity, representing for an oscillation of the first angular frequency its amplitude and phase position relative to the first phase-reference signal, forming a first damping signal with an amplitude in dependence on the amplitude of the first estimated power quantity and with an eligible first phase shift in relation to the phase position thereof, and by influencing an actuator in dependence on the first damping signal to thereby influence the power transmitted in the transmission line.

In an advantageous development of the invention, whereby the power system exhibits at least two oscillation modes, at least one second angular-frequency signal is generated in addition thereto, representing a second angular frequency which is given by a priori knowledge of oscillation frequencies expected in the power system, a second phase-reference signal is formed as the time integral of the second angular-frequency signal, a second estimated power quantity is formed in dependence on the characterizing power quantity, representing for an oscillation of the second angular frequency its amplitude and phase position relative to the second phase-reference signal, a second damping signal is formed with an amplitude in dependence on the amplitude of the second estimated power quantity and with an eligible second phase shift in relation to the phase position thereof, and the actuator is influenced also in dependence on the second damping signal.

In another advantageous development of the invention, a correction frequency to the angular-frequency signal(s) is formed in dependence on the actual frequency of the power oscillations when the amplitude of the oscillating component in the estimated power quantity/quantities exceeds an eligible level.

In a further advantageous development of the invention, the damping signal(s) is/are deactivated if the correction frequency exceeds or falls below the respective given levels.

In still another advantageous development of the invention, the amplitude of the damping signal(s) is formed in dependence on an amplification factor which increases with increasing amplitude of the respective estimated power quantity/quantities mentioned.

In yet another advantageous development of the invention, the eligible phase shift(s) mentioned is/are formed in dependence on the amplitude of an estimated value of the mean power in the transmission line.

Further advantageous developments and embodiments of the invention will become clear from the following description and the appended claims.

BRIEF DESCRIPTION OF THE DRAWINGS

The invention will be explained in greater detail by description of embodiments with reference to the accompanying drawings, which are all schematic and in the form of single-line diagrams and block diagrams, respectively, and wherein.

DESCRIPTION OF THE PREFERRED EMBODIMENTS

Figure 1:
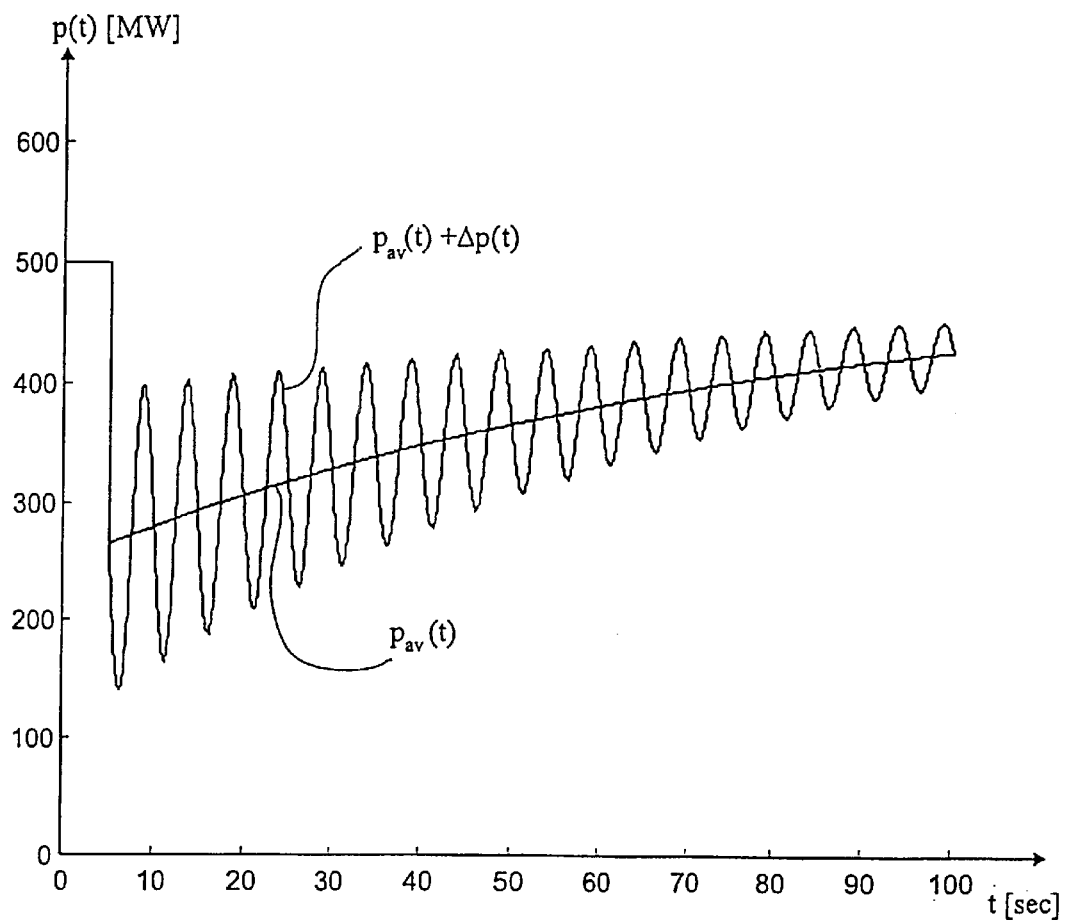
FIG. 1 shows an example of a power disturbance in case of loss of a generator in a power system.

The following description relates to the method as well as to the device.

It is to be understood that, although the blocks shown in the figures are described as units, members, filters, etc., these are to be understood as means for achieving the desired function, particularly in the case where their functions are implemented as software in, for example, microprocessors.

Especially the blocks and members described in FIGS. 5–9A, 9B may be carried out in some way known to the person skilled in the art, and therefore only their function will be described in the following.

According to the invention, a priori knowledge of the expected frequency of the power oscillation is utilized for estimating the oscillating component of the oscillation without any annoying influence of the simultaneous mean-power change and oscillations with deviating frequency. This is done by carrying out the estimation on the basis of an angular frequency given through knowledge of the expected behaviour—from the point of view of oscillation—of the power system in which the transmission line is included. Such knowledge is obtained in ways known per se to the person skilled in the art by system studies in the form of calculations or simulations, or, alternatively, by observations of the power system, for example in connection with disturbances.

From the identified oscillating component, a damping signal with the desired properties, for example with an amplitude proportional to the amplitude of the oscillation and with the desired relative phase in relation to the oscillation, may then be derived.

Depending on which actuator is utilized for the damping, an additional adaptation of the damping signal may be carried out. This applies, for example, when the actuator is in the form of a controllable series capacitor which is controlled with a reference value for its reactance, or in the form of a static reactive-power compensator which is controlled with a reference value for its susceptance.

By p(t) is meant in the following a quantity characterizing for the active power in a transmission line, for example the above-described calculating value of the power transmitted by the transmission line, and the power delivered by a generator to a power network via a transmission line, respectively. Let it further be assumed that the expected oscillation frequency is known and that its angular frequency is $\Omega$.

A First Embodiment of the Invention

In a certain time interval, the active power may be expressed in terms of a mean power $P_{av}$ and a superimposed oscillating component $\Delta p(t)$ according to $$p(t) = P_{av} + \Delta p(t)$$

$$\Delta p(t) = Re\{\Delta \vec{P} e^{j\theta(t)}\}$$

$$\theta(t) = \Omega t \qquad (1)$$

where $\theta(t)$ is a phase-reference signal formed as the time integral of the given angular frequency $\Omega$, $P_{av}$ is a scalar constant or a slowly varying function of the time, and $\Delta \vec{P}$ is a complex constant or a slowly varying function of the time. The task is thus to identify these constants in an efficient way. The phase-reference signal is thus used as a reference for phase position for the oscillating component $\Delta p(t)$.

The expression (1) is re-written in the following way, where an asterisk as upper index denotes a complex conjugation of the corresponding quantity, $$p(t) = P_{av} + \tfrac{1}{2}\Delta \vec{P} e^{j\theta(t)} + \tfrac{1}{2}\Delta \vec{P}^* e^{-j\theta(t)} \qquad (2)$$

whereupon the expressions (1) and (2) are transformed into $$\Delta \vec{P} = \{2[p(t)-P_{av}]-\Delta \vec{P}^* e^{-j\theta(t)}\} e^{-j\theta(t)}$$

$$P_{av} = p(t) - Re\{\Delta \vec{P}^* e^{-j\theta(t)}\} \qquad (3)$$

The righthand terms in expression (3) become constants (complex and scalar, respectively) if the power signal p(t) may be produced as in expression (1). Let it now be assumed that estimated values of the constants $\tilde{P}_{av}$ and $\Delta \tilde{P}$ are available, such that these estimated values in expression (3) may replace the constants $P_{av}$ and $\Delta \vec{P}$ respectively. This gives $$\Delta \vec{P} \approx \{2[p(t)-\tilde{P}_{av}]-\Delta \tilde{P}^* e^{-j\theta(t)}\} e^{-j\theta(t)}$$

$$P_{av} \approx p(t) - Re\{\Delta \tilde{P}^* e^{-j\theta(t)}\} \qquad (4)$$

To the extent that the estimated values are correct and on condition that the expression (1) approximates the actual quantity p(t) characterizing for the active power, the righthand terms in the expression (4) will be constant. After a signal processing comprising low-pass filtering on the righthand term in expression (4), estimated values of the desired constants $\tilde{P}_{av}$ and $\tilde{P}$ are therefore obtained. This gives the following algorithm:

$$\Delta \tilde{P} = H_{LP,ph}\{[2(p(t)-\tilde{P}_{av})-\Delta \tilde{P}^* e^{-j\theta(t)}] e^{-j\theta(t)}\}$$

$$\tilde{P}_{av} = H_{LP,av}\{p(t)-Re[\Delta \tilde{P}^* e^{-j\theta(t)}]\} \qquad (5)$$

where $H_{LP,ph}$ and $H_{LP,av}$ are operators representing filters with low-pass characteristic. Low-pass filtering of the complex quantity $\Delta \tilde{P}$ is then performed on its real part and its imaginary part, respectively, separately.

Figure 5:
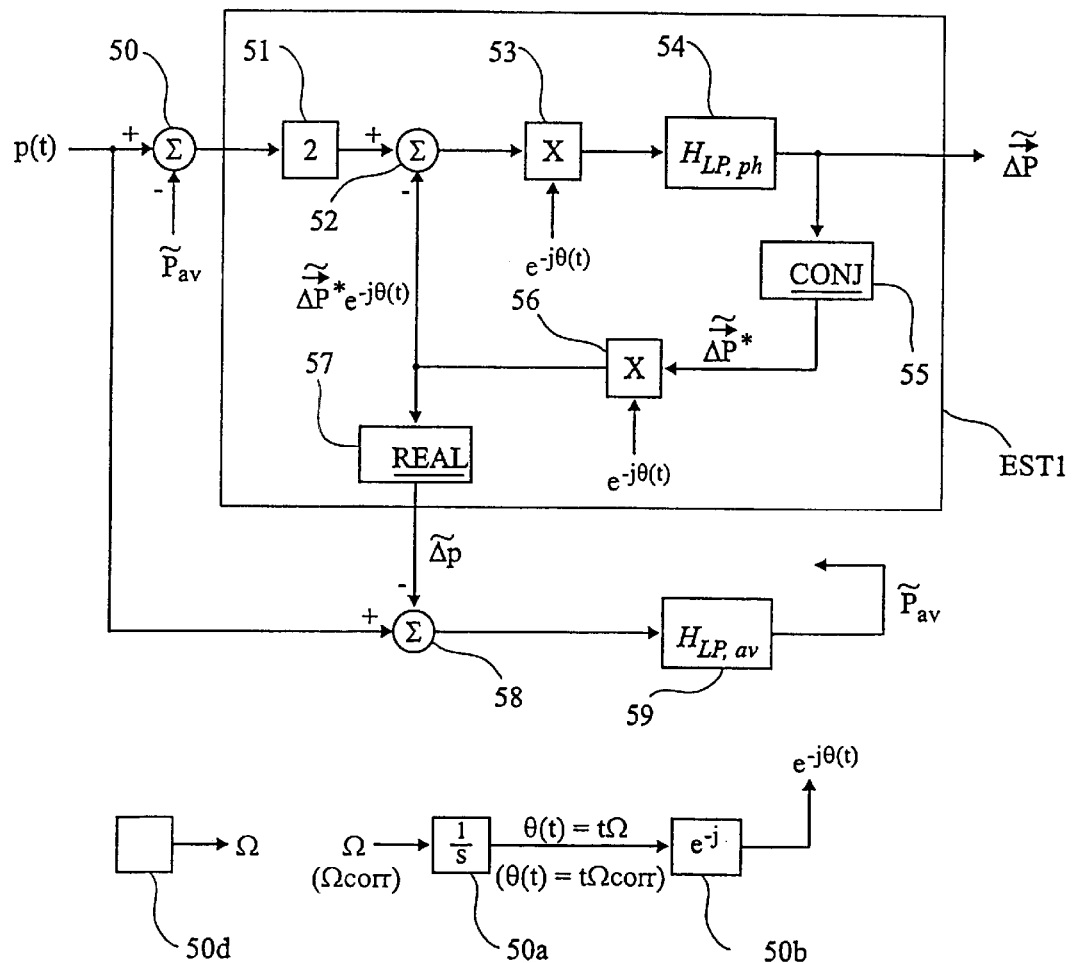
FIG. 5 shows a first embodiment of the invention for forming an estimated power quantity representing an oscillating component of a power oscillation.

FIG. 5 shows in the form of block diagrams how the separation of the oscillating component is carried out according to this embodiment of the invention. It can be shown that the estimated values of the desired constants $\tilde{P}_{av}$ and $\Delta \tilde{P}$, after a transient dependent on the time constants in the low-pass filters, assume stabilized values describing the oscillating component $\Delta p(t)$ according to expression (1) above.

A difference-forming member 50 is supplied with and forms as output signal the difference of the quantity p(t), characterizing for the active power, and an estimated value $\tilde{P}_{av}$ of the mean power $P_{av}$ formed in a way which will become clear from the following description. The output signal from the member 50 is supplied to a multiplying member 51, where it is multiplied by a factor 2. A difference-forming member 52 is supplied with and forms as output signal the difference of the result of the multiplication and the calculating value $\Delta \tilde{P}^* e^{-j\theta(t)}$, formed in a way which will become clear from the following description. The output signal from the member 52 is supplied to a multiplying member 53 for multiplication by a factor $e^{-j\theta(t)}$ and the result of the multiplication is supplied to a low-pass filtering member 54 characterized by a transfer function $H_{LP,ph}$. A comparison with the expression (5) above now shows that the output signal from the member 54 constitutes the desired estimated power quantity $\Delta \tilde{P}$.

The output signal from the member 54 is supplied to a calculating member 55 which, as output signal, forms the complex conjugate $\Delta \tilde{P}^*$ to the estimated power quantity $\Delta \tilde{P}$, which output signal is supplied to a multiplying member 56 for multiplication by the factor $e^{-j\theta(t)}$. The result of this multiplication constitutes the calculating value $\Delta \tilde{P}^* e^{-j\theta(t)}$, which, for one thing, as mentioned above, is supplied to the difference-forming member 52 and, for another, a calculating member 57 which, as output signal, forms the real part of the supplied calculating value. This output signal, designated $\Delta \tilde{p}$ in the figure, thus constitutes an estimated value of the oscillating component $\Delta p(t)$ of the frequency $\Omega$ superimposed on the mean power A difference-forming member 58 is supplied with and forms as output signal the difference of the quantity p(t), characterizing for the active power, and the output signal from the calculating member 57. The output signal from the member 58 is supplied to a low-pass filtering member 59 characterized by a transfer function $H_{LP.av}$. A comparison with the expression (5) above now shows that the output signal from the member 59 constitutes the estimated value $\tilde{P}_{av}$ of the mean power $P_{av}$, which, as mentioned above, is supplied to the difference-forming member 50.

The above-mentioned members 51–57 together form a calculating device EST1, which together with the difference-forming member 50 constitutes a filter device.

FIG. 5 also illustrates how the phase-reference signal $\theta(t)$ is formed as the time integral of the given angular frequency $\Omega$ in an integrating member 50a and how the above-mentioned factor $e^{-j\theta(t)}$ is formed in dependence on the phase-reference signal in a calculating member 50b. An angular frequency $\Omega$ representing the giving angular frequency is formed in a manner known per se in a signal-generating member, illustrated in FIG. 5 by a block 50d, the output signal of which is integrated in the integrating member 50a.

The filter device shown in FIG. 5 thus achieves a signal processing which comprises low-pass filtering of the estimated power quantity $\Delta \tilde{P}$ and of the estimated mean power $\tilde{P}_{av}$ in the transmission line by means of low-pass filtering members arranged in a cross-connection in that the estimated power quantity $\Delta \tilde{P}$ is formed in dependence on components of the estimated value $\tilde{P}_{av}$ of the mean power, obtained through low-pass filtering, and the estimated value $\tilde{P}_{av}$ of the mean power is formed in dependence on components of the estimated power quantity $\Delta \tilde{P}$, also obtained through low-pass filtering.

The low-pass filtering members 54 and 59 may, for example, be realized as first-order low-pass filters or second-order Bessel- or Butterworth-type filters with a bandwidth at −3 dB of typically (0.2–0.5)*$\Omega$.

A second Embodiment of the Invention

The second embodiment of the invention is based on the use of a recursive regression according to the least-squares method, a so-called RLS algorithm. The mathematical background of the estimation is described below.

The expression (1) above may also be-written as $$p(t) = P_{av} + \Delta P_x \cos \theta(t) - \Delta P_y \sin \theta(t)$$

$$\Delta \vec{P} = \Delta P_x + j\Delta P_y$$

$$\theta(t) = \Omega t \quad (6)$$

where $\Delta P_x$ and $j\Delta P_y$ designate the real component and the imaginary component, respectively, of the complex quantity $\Delta \vec{P}$. Here, all the unknown constants $P_{av}$, $\Delta P_x$, and $\Delta P_y$ are real. The first equation in the expression (6) may then be conceived as a regressive equation $$p(t) = \varphi^T(t)\Theta \quad (7)$$

$$\varphi^T(t) = [1 \quad \cos\theta(t) \quad -\sin\theta(t)]$$

$$\Theta = \begin{bmatrix} P_{av} \\ \Delta P_x \\ \Delta P_y \end{bmatrix}$$

where $\varphi^T(t)$ is a so-called regression vector and $\Theta$ is the sought parameter vector with the constants $P_{av}$, $\Delta P_x$, and $\Delta P_y$. The parameter vector may be determined with the aid of a recursive least-squares estimation, a so-called RLS algorithm in a manner known per se, for example in the manner described in Åström/Wittenmark: Adaptive Control (ISBN 0-201-55866-1).

The solution is given by the following expression $$\tilde{\Theta}(t_k) = \tilde{\Theta}(t_{k-1}) + K(t_k)\lfloor p(t_k) - \varphi^T(t_k)\tilde{\Theta}(t_{k-1}) \rfloor \quad (8)$$

$$K(t_k) = \frac{\Pi(t_{k-1})\varphi(t_k)}{\lambda + \varphi^T(t_k)\Pi(t_{k-1})\varphi(t_k)}$$

$$\Pi(t_k) = \frac{[I - K(t_k)\varphi^T(t_k)]\Pi(t_{k-1})}{\lambda}$$

where $$\tilde{\Theta} = \begin{bmatrix} \tilde{P}_{av} \\ \Delta \tilde{P}_x \\ \Delta \tilde{P}_y \end{bmatrix} \quad (9)$$

is the estimated parameter vector, 1 is a unit matrix, and $\lambda$ the so-called forgetting factor which controls the memory of the algorithm.

Figure 6:
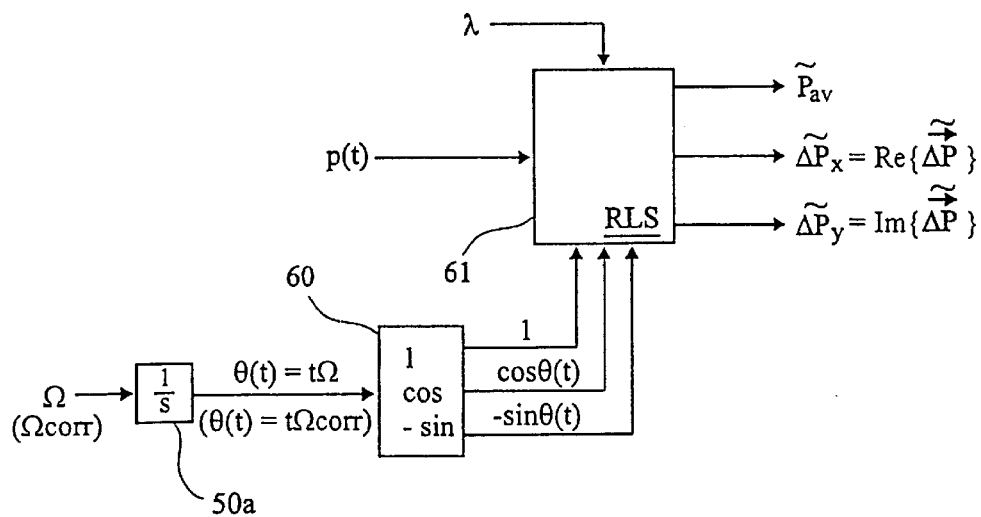
FIG. 6 shows a second embodiment of the invention for forming an estimated power quantity representing an oscillating component of a power oscillation.

FIG. 6 shows in the form of a block diagram the second embodiment of the invention.

A calculating block 60 is supplied with the phase-reference signal, formed in the manner stated above, and forms as output signal the regression vector [1 cos $\theta$ −sin $\theta$].

The quantity p(t) characterizing for the active power, the regression vector and the forgetting factor are supplied to a calculating member 61, which, in dependence on the supplied values and, in the manner mentioned above, as output signal forms the estimated parameter vector according to the expression (9).

Generation of a Damping Signal for Influencing the Damping Equipment According to the Invention Based on the estimated power quantity $\Delta \tilde{P}$, preferably obtained through any of the embodiments described above for separation of the oscillating component in the power signal, a damping signal D(t) can be generated. The amplitude thereof is formed in dependence on the amplitude $|\Delta \tilde{P}|$ of the oscillating component, for example proportional thereto with an amplification factor $k_D$ and with an eligible phase shift 90°+$\alpha$ in relation to the phase position for the oscillating component in the power signal.

$$D(t) = k_D \text{Re}\{j\Delta\tilde{P}e^{j[\theta(t)+\alpha]}\} \quad (10)$$
$$= -k_D \text{Im}\{\Delta\tilde{P}e^{j[\theta(t)+\alpha]}\}$$
$$= -k_D\{[\Delta\tilde{P}_x \sin\theta(t) + \Delta\tilde{P}_y \cos\theta(t)]\cos\alpha +$$
$$[\Delta\tilde{P}_x \cos\theta(t) + \Delta\tilde{P}_y \sin\theta(t)]\sin\alpha\}$$

It can be shown that, if only the moment of inertia of the generators are taken into consideration and if the losses in the transmission system are neglected, the ideal phase shift between power oscillation and damping signal is 90°. The angle α in the expression (10) above has been added to make possible a correction of the ideal phase shift taking into account the influence of losses and other factors. The angle α is, in practice, of the order of some ten degrees.

Figure 7:
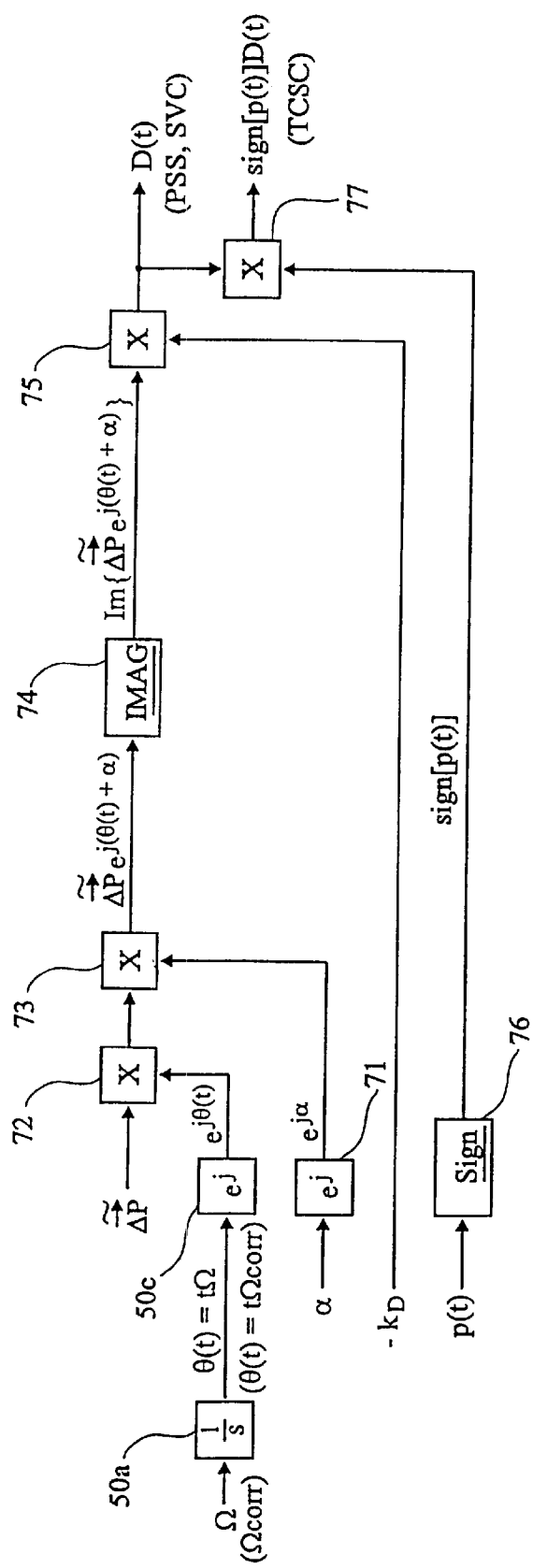
FIG. 7 shows an example of the formation of a control signal according to the invention for damping power oscillations.

FIG. 7 shows the expression (10) in the form of a schematic block diagram.

The phase reference signal θ(t) is formed as the time integral of the given angular frequency Ω in the integrated member 50a and a factor $e^{j\theta(t)}$ formed in dependence on the phase reference signal in a calculating member 50c. A factor $e^{j\alpha}$ is formed in dependence on the angle α in a calculating member 71.

The estimated power quantity $\Delta\tilde{P}$ and the factor $e^{j\theta(t)}$ are supplied to a multiplying member 72 and the result of the multiplication is supplied together with the factor $e^{j\alpha}$ to a multiplying member 73. The output signal from the multiplying member 73 is supplied to a calculating block 74 which, as output signal, forms the imaginary part of the signal supplied thereto. The output signal from the calculating block 74 is thus equal to $\text{Im}\{\Delta\tilde{P}e^{j[\theta(t)+\alpha]}\}$, that is, apart from the factor $-k_D$ equal to the third term in the expression (10). The output signal from the block 74 and the factor $-k_D$ are supplied to a multiplying member 75, the output signal of which thus constitutes the damping signal D(t).

The damping signal D(t) thus represents a desired influence on the torque on the oscillating machines.

Figure 2:
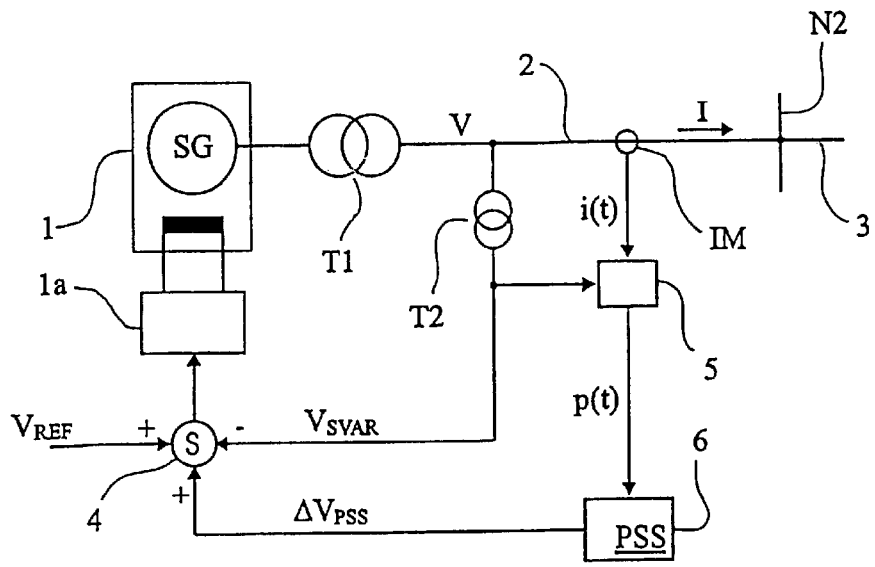
FIG. 2 shows a known principle of damping power oscillations by means of the magnetization equipment on a generator connected to the network.

In the case where the actuator consists of magnetization equipment for a generator, as described above with reference to FIG. 2, the damping signal, after level adaptation and limitation with respect to the operating range of the magnetization equipment, may be used directly as a control signal for the damping equipment. This is illustrated in FIG. 7 in the form of an output from the multiplying member 75 designated PSS.

Figure 3:
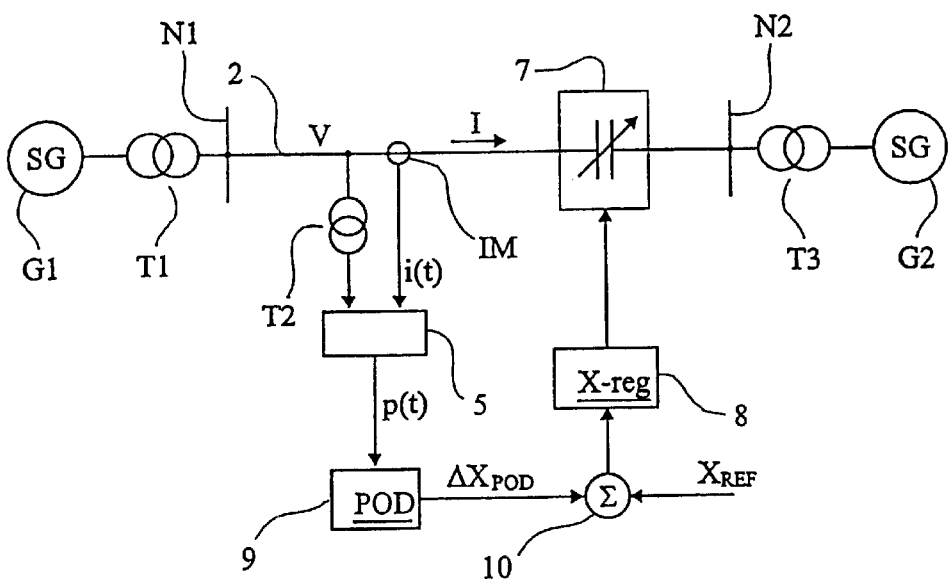
FIG. 3 shows a known principle of damping power oscillations by means of a controlled series capacitor connected into a transmission line.
Figure 4:
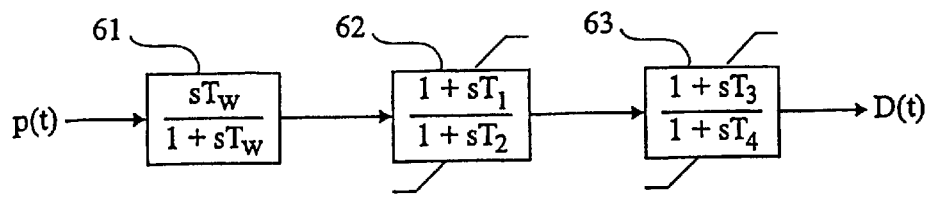
FIG. 4 shows a known method of forming a control signal for damping of power oscillations.

In the case where the actuator consists of a controllable series capacitor, as described above with reference to FIG. 3, the total effective reactance for the connection via the transmission line shall be influenced.

The influence on the torque in a generator will thus be dependent on the instantaneous direction of the power flow. Generally, damping is achieved if the total effective reactance of the transmission line decreases (i.e. becomes less inductive) when the power deviates from a zero line for the power, and if the total effective reactance increases (i.e. becomes more inductive) when the power approaches this zero line.

It is thus possible to transform the damping signal to a desired reactance signal (a signal corresponding to a reactance value for the controllable series capacitor) according to the following $$\Delta X_{REF} = \text{sign}[p(t)]D(t) \quad (11)$$

where sign[p(t)] designates the instantaneous power flow direction. As illustrated in FIG. 7, the signal sign[p(t)] is formed in some manner known per se in dependence on the quantity p(t), characterizing for the active power, in a calculating member 76 and is supplied together with the damping signal D(t) to a multiplying member 77, which as output signal thus forms a signal according to the expression (11) above.

This is illustrated in FIG. 7 in the form off an output from the multiplying member 77 designated TCSC.

The signal thus obtained is adapted with respect to level and is then limited to those reactance values which the main circuit of TCSC can execute. These reactance values may be continuously or discontinuously variable or a combination of continuously and discontinuously variable values.

Figure 9A:
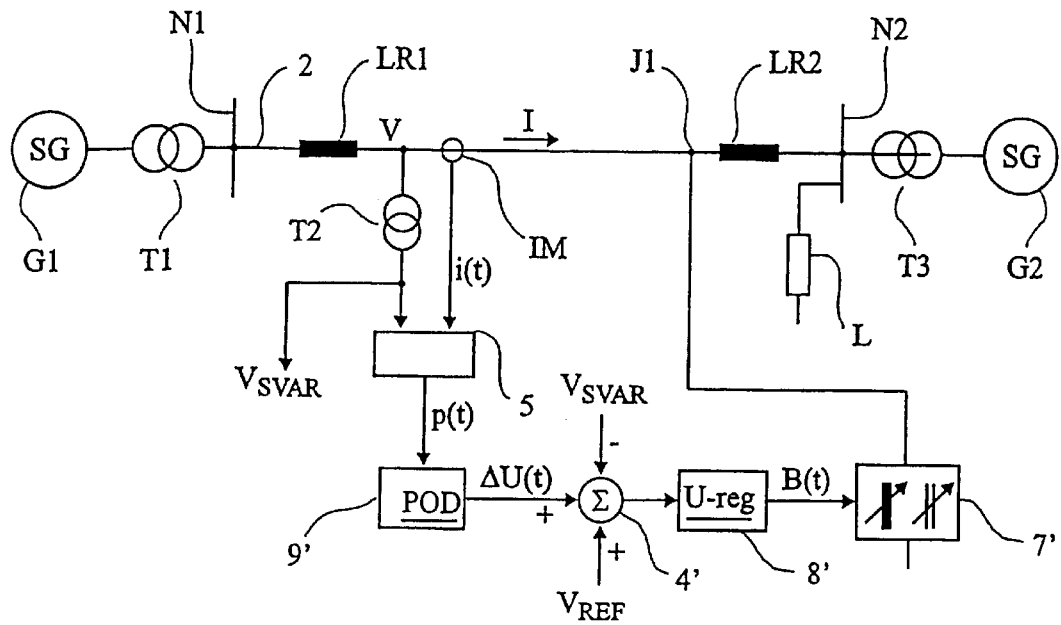
FIG. 9A shows a known principle of damping of power oscillations by means of a controlled reactive-power compensator connected to a transmission line.

In the case where the actuator consists of a reactive-power compensator, as described above with reference to FIG. 9A, the damping signal may be directly used, after adaptation with respect to level and limitation with respect to the operating range of the compensator, as a control signal for the voltage controller of the compensator. This is illustrated in FIG. 7 in the form of an output from the multiplying member 75 designated SVC. The necessity, in certain applications, of sign reversal of the damping signal or of the correction value ΔU(t) to the reference value of the voltage controller, depending on the damping signal, as described with reference to FIG. 9A, is not shown in FIG. 7, but this modification may of course, where necessary, be carried out by a person skilled in the art.

Frequency Correction

As mentioned above, the control device according to the invention is intended for power oscillations of a certain given frequency. In a power system, different operating states occur depending on which lines are in operation at a certain time. The frequency of the power oscillation in a certain mode will thus vary somewhat in dependence on the operating state of the power system. If the frequency of the actual oscillation deviates from the frequency to which the control device is set, the vector $\Delta\tilde{P}$, representing the estimated power quantity, will rotate with the deviation frequency. The phase shift between the damping signal and the actual oscillation thus does not become the intended 90°+α.

According to a development of the invention, a frequency correction to the given angular frequency Ω is therefore introduced in order to adapt the frequency of the damping signal to the frequency of the actual oscillation. An embodiment of such a frequency correction is described in the following and illustrated in FIG. 8.

The estimated power quantity $\Delta\tilde{P}$ is supplied to an absolute-value forming member 81 which, as output signal, forms the absolute value $|\Delta\tilde{P}|$ of the amplitude of the estimated power quantity. The estimated power quantity $\Delta\tilde{P}$ is also supplied to a phase-value forming member 82 which, as output signal, forms the argument $\phi = \arg\{\Delta\tilde{P}(t)\}$ representing the phase position of the estimated power quantity.

The output signal from the absolute-value forming member 81, that is, the absolute value $|\Delta\tilde{P}|$, is supplied to a comparing member 83 for comparison with a comparison value AMPR. In the event that the absolute value $|\Delta\tilde{P}|$ exceeds the comparison value AMPR, the comparing member 83 forms a logic signal DEV which is supplied to a time-lag element 84 which forwards the signal DEV, delayed by an eligible time t1 and now designated DEV', to a so-called sample-and-hold unit 85. The unit 85 is also supplied with the estimated power quantity $\Delta\tilde{P}$ and, when it receives the delayed signal DEV', senses the power quantity and forwards the value thereof at this time, here designated t0, to a phase-value forming member 86. The phase-value forming member 86 forms as output signal the argument $$\phi_{ref}=\arg\{\Delta \tilde{P}(t_0)\} \quad (12)$$

representing the phase position of the estimated power quantity at the time t0.

The output signal $\phi_{ref}$ from the phase-value forming member 86 is now allowed to constitute a reference value for the actual phase position of the estimated power quantity, $\phi=\arg\{\Delta \tilde{P}\}$, which, as described above, is formed as output signal from the phase-value forming member 82.

The signals $\phi_{ref}$ and $\phi$ are supplied to a difference-forming member 87 and their difference to a frequency controller 88, preferably with proportional-integrating characteristic. The output signal from the frequency controller 88 will thus have the form $$\Delta\Omega(t) = k_{DF} \frac{1+sT_{DF}}{sT_{DF}} \{\arg[\Delta\tilde{P}(t)] - \phi_{ref}\} \quad (13)$$

where $\Delta\Omega$ constitutes a correction frequency to the given angular frequency $\Omega$ and $k_{DF}$ and $T_{DF}$ are amplification and time constant, respectively, in the frequency controller.

The correction frequency $\Delta\Omega$ and the given angular frequency $\Omega$ are supplied to a summing member 89, which as output signal forms a corrected angular frequency $\Omega_{corr}$, according to the expression $$\Omega_{corr}=\Omega+\Delta\Omega \quad (14)$$

Figure 8:
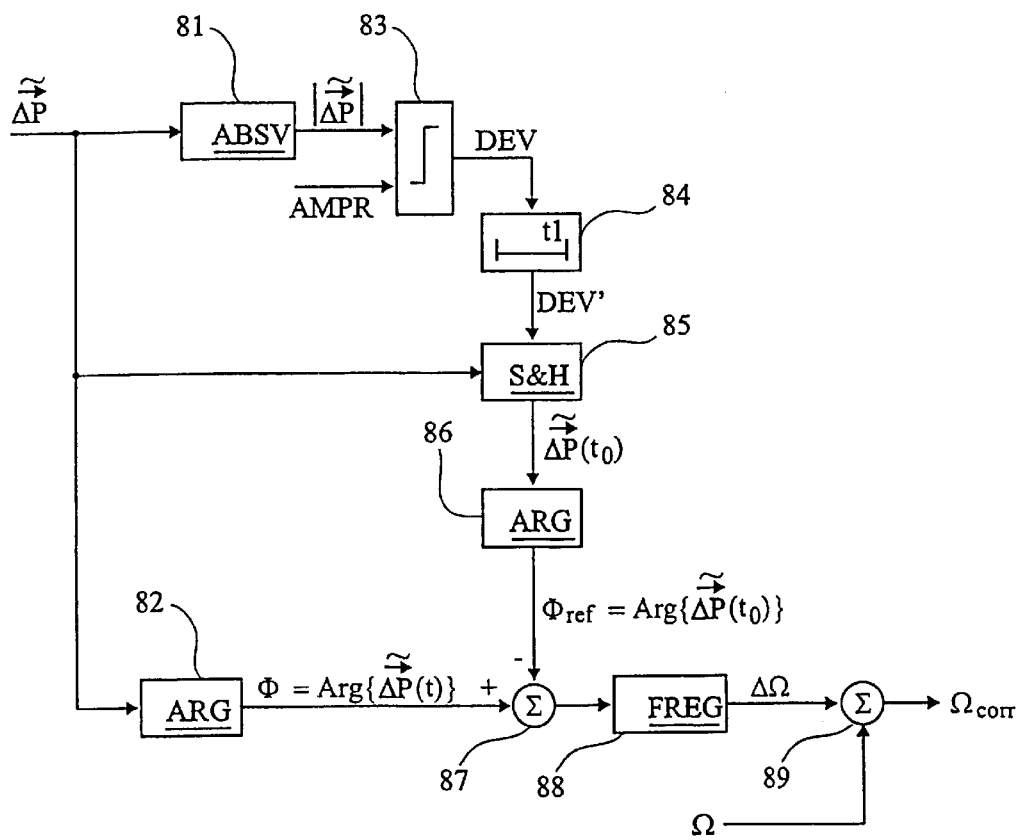
FIG. 8 shows an embodiment of a development of the invention for frequency correction of a set frequency for a power oscillation.

In this development of the invention, the given angular frequency $\Omega$, in the embodiments of the invention described with reference to FIGS. 5, 6 and 7, is replaced by the corrected angular frequency $\Omega_{corr}$ in the expressions described above, whereas the given angular frequency $\Omega$ is only utilized to be supplied to the summing member 89, as described with reference to FIGS. 8 and 9B. This is illustrated in FIGS. 5, 6 and 7 by an input signal $\Omega_{corr}$ to the integrating member 50a, put in parenthesis. The corresponding output signal from the integrating member, that is, the phase-reference signal $\theta(t)$, is also indicated in parenthesis.

The delay t1 in the time-lag element 84 may to advantage be chosen to constitute 1–2 cycles of the given angular frequency $\Omega$.

To prevent the damping from interfering and destabilizing oscillating modes in the power system for which it is not intended, in an additional development of the invention maximum permissible frequency deviations $\Delta\Omega$ both upwards and downwards from the given angular frequency for the power oscillation, set in the control system, are defined. The frequency controller 88 is thus modified such that, for all oscillations where the frequency deviation $\Delta\Omega$ exceeds the maximum permissible frequency deviation, its output signal remains at this maximum permissible frequency deviations, and, for all oscillations where the frequency deviation falls below the downward maximum permissible frequency deviation, its output signal remains at this downward maximum permissible frequency deviation. When the frequency controller in connection with power oscillations in the transmission line remains in any of these limitations for a predetermined period of time, the damping signal is deactivated.

Figure 9B:
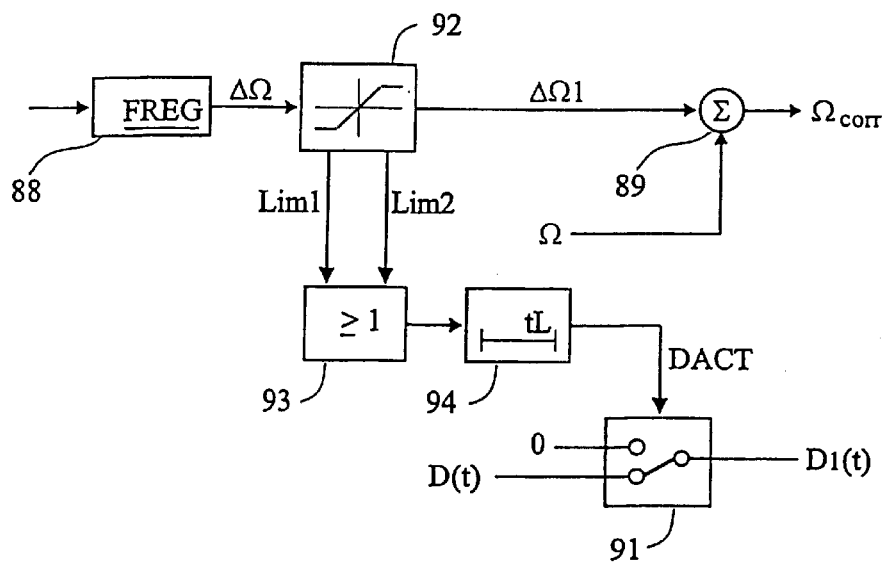
FIG. 9B shows a development of the invention for deactivating a damping signal.

This is illustrated schematically in FIG. 9B. A selector 91 has two inputs, one being supplied with the damping signal D(t) formed in the manner described above, and the other being supplied with a signal with the value ZERO and forwarding on its output a signal designated D1(t). The signal D1(t) is, in the normal position of the selector, identical with the damping signal D(t) but in dependence on an influencing signal DACT, supplied to the selector, the position of the selector is changed such that it forwards the signal with the value ZERO. The frequency deviation $\Delta\Omega$, formed as output signal from the frequency controller 88, is supplied to a limiting device 92 with schematically indicated limitations, both upwards and downwards, of the signal supplied thereto. The output signal $\Delta\Omega1$ from the limiting device 92 is thus equal to the frequency deviation $\Delta\Omega$ as long as the latter does not exceed the maximum permissible frequency deviations but is otherwise limited to these deviations. The output signal $\Delta\Omega1$ from the limiting device 92 is supplied, in this development of the invention, to the summing member 89, in a manner analogous to that described with reference to the expression (14) above.

In some manner known per se, the limiting device forms logic output signals Lim1 and Lim2, respectively, when the frequency deviation $\Delta\Omega$ reaches an upper and a lower limitation, respectively. The signals Lim1 and Lim2 are supplied to an OR circuit 93 which forwards these to a timing circuit 94. In the event that any of the signals Lim1 and Lim2 remains at least for a predetermined period of time tL, the timing circuit forms, in some manner known per se, the influencing signal DACT.

Power-dependent Amplification and/or Phase Shift

Oscillations occurring during normal operation normally exhibit a low amplitude and the inherent damping ability of the power system is normally sufficient for damping such oscillations. Under such circumstances, an intervention by the damping device is not necessary, and therefore a low value may advantageously be imparted to the amplification factor $k_D$ in the damping signal at such oscillation amplitudes, among other things to reduce the thermal stress on the actuators which are to deliver the damping effect.

To ensure that sufficient damping is achieved at increasing oscillation amplitudes, the value of the amplification factor should then also increase, advantageously in dependence on the amplitude of the oscillation, for example stepwise or according to a chosen continuous characteristic.

Especially in the case where the actuator consists of a static shunt compensator for reactor power connected to the transmission line, the damping ability of which is normally dependent on the magnitude and direction of the power flow in the transmission line, it may be advantageous to form the eligible angle $\alpha$, described with reference to FIG. 7 in the section entitled 'Generation of damping signal'.

Figure 10A:
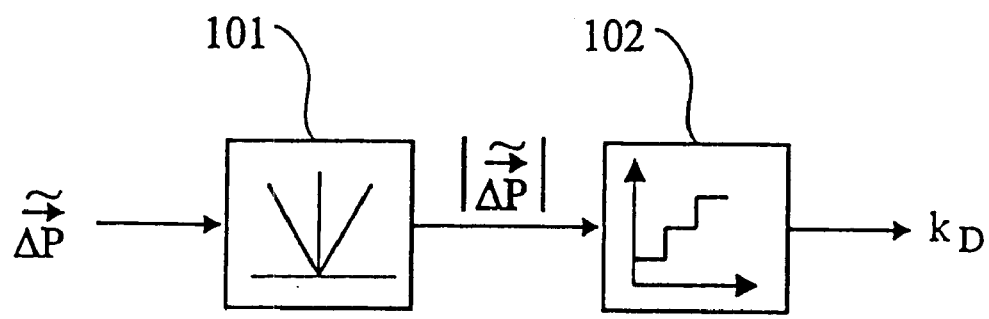
FIG. 10A shows an embodiment of a development of the invention for power-dependent adaptation of the amplification of the damping signal.

FIG. 10A shows an embodiment of a power-dependent adaptation of the amplification factor $k_D$. The estimated power quantity $\Delta\tilde{P}$, formed, for example, by means of the filter device described with reference to FIG. 5, is supplied to an absolute-value forming member 101, the output signal $|\Delta\tilde{P}|$ of which is supplied to a functional-value forming member 102. This member generates a value $k_D$ of the amplification factor in dependence on the amplitude of the estimated power quantity and according to a characteristic selected for the functional-value forming member, this characteristic being illustrated in the figure as a step-by-step function. The output signal from the functional-value forming member 102 is supplied, with reversed sign, to the multiplying member 75 described with reference to and shown in FIG. 7.

Figure 10B:
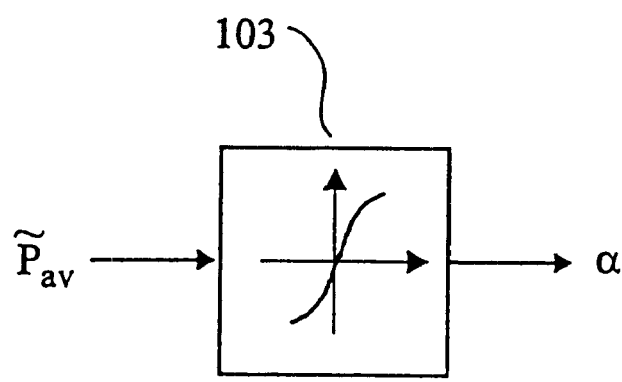
FIG. 10B shows an embodiment of a development of the invention for power-dependent adaptation of the phase shift of the damping signal.

FIG. 10B shows an embodiment of a power-dependent adaptation of the eligible angle $\alpha$. The estimated mean power $\tilde{P}_{av}$, formed, for example, by means of the filter device described with reference to FIG. 5, is supplied to a functional-value forming member 103. This member generates a value α of the eligible angle in dependence on the amplitude of estimated mean power and according to a characteristic selected for the functional-value forming member, this characteristic being illustrated in the figure as a continuous non-linear function which may adopt both negative and positive values. The output signal from the functional-value forming member 103 is supplied to the calculating member 71 described with reference to and shown in FIG. 7.

Simultaneous Damping of Oscillations of More Than One Oscillation Frequency

The foregoing description relates to embodiments of the invention where it is assumed that the device is intended for damping of oscillations of one single given frequency.

In a power system with more than two generators, several oscillation modes with different frequencies occur, in which different groups of generators oscillate between themselves.

In an advantageous development of the invention, the damping device may be designed for achieving simultaneous damping of several such oscillating modes with different but given frequencies. The following description of this development relates only to two oscillation modes with the angular frequencies $\Omega_1$ and $\Omega_2$, respectively. However, the principle described may be extended, in a manner obvious to the person skilled in the art, to apply to three or more oscillation modes.

Let it be assumed that two expected oscillation frequencies are known and that the angular frequencies thereof are $\Omega_1$ and $\Omega_2$, respectively. The expression (1) above may then be generalized to read $$p(t)=P_{av}+\Delta p_1(t)+\Delta p_2(t)$$

$$\Delta p_1(t)=Re\{\Delta \vec{P}_1 e^{j\Theta_1(t)}\}$$

$$\Delta p_2(t)=Re\{\Delta \vec{P}_2 e^{j\Theta_2(t)}\}$$

$$\Theta_1(t)=\Omega_1 t$$

$$\Theta_2(t)=\Omega_2 t \qquad (15)$$

By a reasoning completely analogous to that which, based on the expression (1), results in the expression (5) for the estimated values of the desired constants $\tilde{P}_{av}$ and $\Delta \tilde{P}$, an algorithm is now obtained which expresses the estimated values of the desired constants $\tilde{P}_{av}$, $\Delta \tilde{P}_1$ and $\Delta \tilde{P}_2$ of the following form $$\Delta \tilde{\vec{P}}_1=H_{LP.ph1}\{[2(p(t)-\tilde{P}_{av}-Re(\Delta \tilde{\vec{P}}_2 * e^{-j\Theta_2(t)}))-\Delta \tilde{\vec{P}}_1 * e^{-j\Theta_1(t)}]e^{-j\Theta_1(t)}\}$$

$$\Delta \tilde{\vec{P}}_2=H_{LP.ph2}\{[2(p(t)-\tilde{P}_{av}-Re(\Delta \tilde{\vec{P}}_1 * e^{-j\Theta_1(t)}))-\Delta \tilde{\vec{P}}_2 * e^{-j\Theta_2(t)}]e^{-j\Theta_2(t)}\}$$

$$\tilde{P}_{av}=H_{LP.av}\{p(t)-Re[\Delta \tilde{\vec{P}}_1 * e^{-j\Theta_1(t)}+\Delta \tilde{\vec{P}}_2 * e^{-j\Theta_2(t)}]\} \qquad (16)$$

where $H_{LP.ph1}$, $H_{LP.ph2}$ and $H_{LP.av}$ are operators representing filters with low-pass characteristic. The low-pass filtering of the complex quantities $\Delta \tilde{P}_1$, and $\Delta \tilde{P}_2$, is thus carried out on the real parts and the imaginary parts thereof, respectively, each separately.

Figure 11:
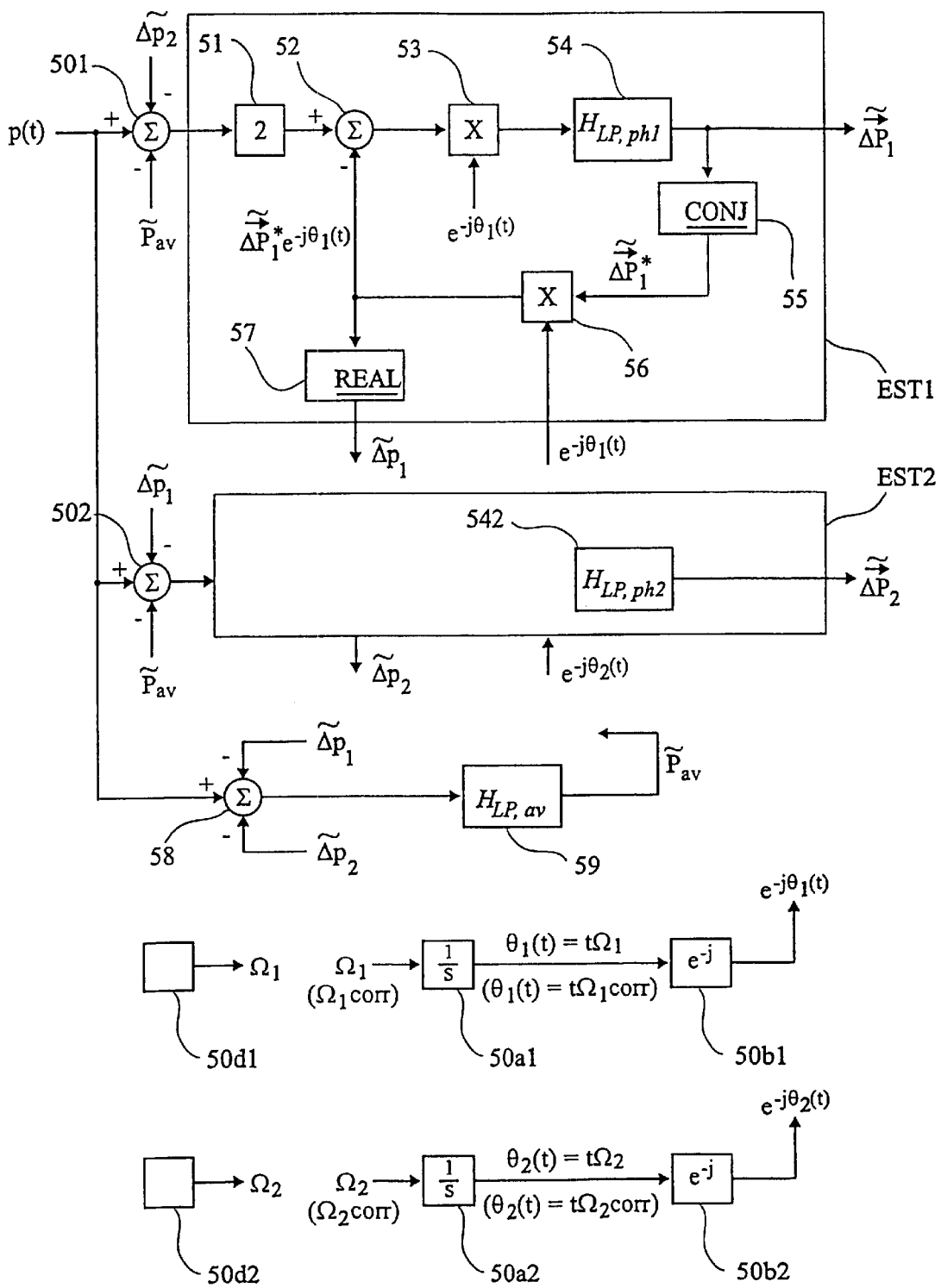
FIG. 11 shows a development of the first embodiment of the invention for forming estimated power quantities representing two simultaneously oscillating components of a power oscillation.

FIG. 11 shows in the form of a block diagram how the separation of the oscillating components according to the expression (16) is carried out according to this development of the invention.

A difference-forming member 501 is supplied with and forms as output signal the difference of, for one thing, the quantity p(t) characterizing for the active power and, for another, en estimated value $\tilde{P}_{av}$ of the mean power $P_{av}$ and an estimated value $\Delta \tilde{p}_2$ of the oscillating component $\Delta p_2$ of the frequency $\Omega_2$, which oscillating component is superimposed on the mean power, and which estimated values are formed in a manner which will be clear from the following. The output signal from the difference-forming member 501 is supplied to the calculating device EST1 described with reference to FIG. 5, which calculating device thus comprises members of the same kind as the members 51–53 and 55–57, described with reference to FIG. 5, and indicated with the same reference numerals in FIG. 11. The low-pass filter 54 shown in FIG. 5 has been indicated in FIG. 11 with a characteristic $H_{LP.ph1}$. In a manner analogous to that described with reference to FIG. 5, the output signal from the low-pass filtering member 54 consists of the desired estimated power quantity $\Delta \tilde{P}_1$, which is also clear on a direct comparison with the expression (16).

A difference-forming member 502 is supplied with and forms as output signal the difference of, on the one hand, the quantity p(t) characterizing for the active power and, on the other hand, an estimated value $\tilde{P}_{av}$ of the mean power $P_{av}$ and an estimated value $\Delta \tilde{p}_1$, of the oscillating component $\Delta p_1$ of the frequency $\Omega_1$, which oscillating component is super-imposed on the mean power, and which estimated values are formed in a manner which will be clear from the following. The output signal from the difference-forming member 502 is supplied to a calculating device EST2 which comprises members 51–53 and 55–57 of the same kind as the calculating device EST1. In order not to make the figure unnecessarily complicated, however, these members are not shown in the device EST2. A low-pass filtering member, indicated with reference numeral 542 in FIG. 11, characterized by a transfer function $H_{LP.ph2}$ is of the same kind as and corresponds to the low-pass filtering member 54 described with reference to FIG. 5. In a manner analogous to that described with reference to FIG. 5, the output signal from the member 542 constitutes the desired estimated power quantity $\Delta \tilde{P}_2$, which is also clear on a direct comparison with the expression (16).

The estimated value $\Delta \tilde{p}_1$, of the oscillating component $\Delta p_1$ of the frequency $\Omega_1$, superimposed on the mean power, and the estimated value $\Delta \tilde{p}_2$ of the oscillating component $\Delta p_2$ of the frequency $\Omega_2$, superimposed on the mean power, are formed in a manner analogous to that described with reference to FIG. 5 as output signals from the calculating member 57 in the calculating devices EST1 and EST2, respectively (member 57 in device EST2 not shown in the figure).

A difference-forming member 58 is supplied with and forms as output signal the difference of the quantity p(t) characterizing for the active power and the output signals $\Delta \tilde{p}_1$ and $\Delta \tilde{p}_2$ from the calculating member 57 in the device EST1 and in the device EST2, respectively. The output signal from the member 58 is supplied to a low-pass filtering member 59 characterized by a transfer function $H_{LP.av}$, which member is of the same kind as the low-pass filtering member, described with reference to FIG. 5, with the same reference numeral. A comparison with the expression (16) above now shows that the output signal from the member 59 constitutes the estimated value $\tilde{P}_{av}$ of the mean power $P_{av}$, which, as mentioned above, is supplied to the difference-forming members 501 and 502.

FIG. 11 also illustrates how the phase-reference signal $\Theta_1(t)$ is formed as the time integral of the given angular frequency $\Omega_1$ in an integrating member 50a1 and how the factor $e^{-j\theta_1(t)}$ is formed in dependence on the phase-reference signal in the calculating member 50b1. An angular-frequency signal $\Omega_1$ representing the given angular frequency is formed in a manner known per se in a signal-generating member, illustrated in FIG. 11 by a block 50d1, the output signal of which is integrated in the integrating member 50a1.

The phase-reference signal $\theta_2(t)$, the factor $e^{-j\theta_2(t)}$ and an angular-frequency signal $\Omega_2$ are formed in an analogous manner in an integrating member 50a2, in a calculating member 50b2, and in a signal-generating member 50d2.

Figure 12:
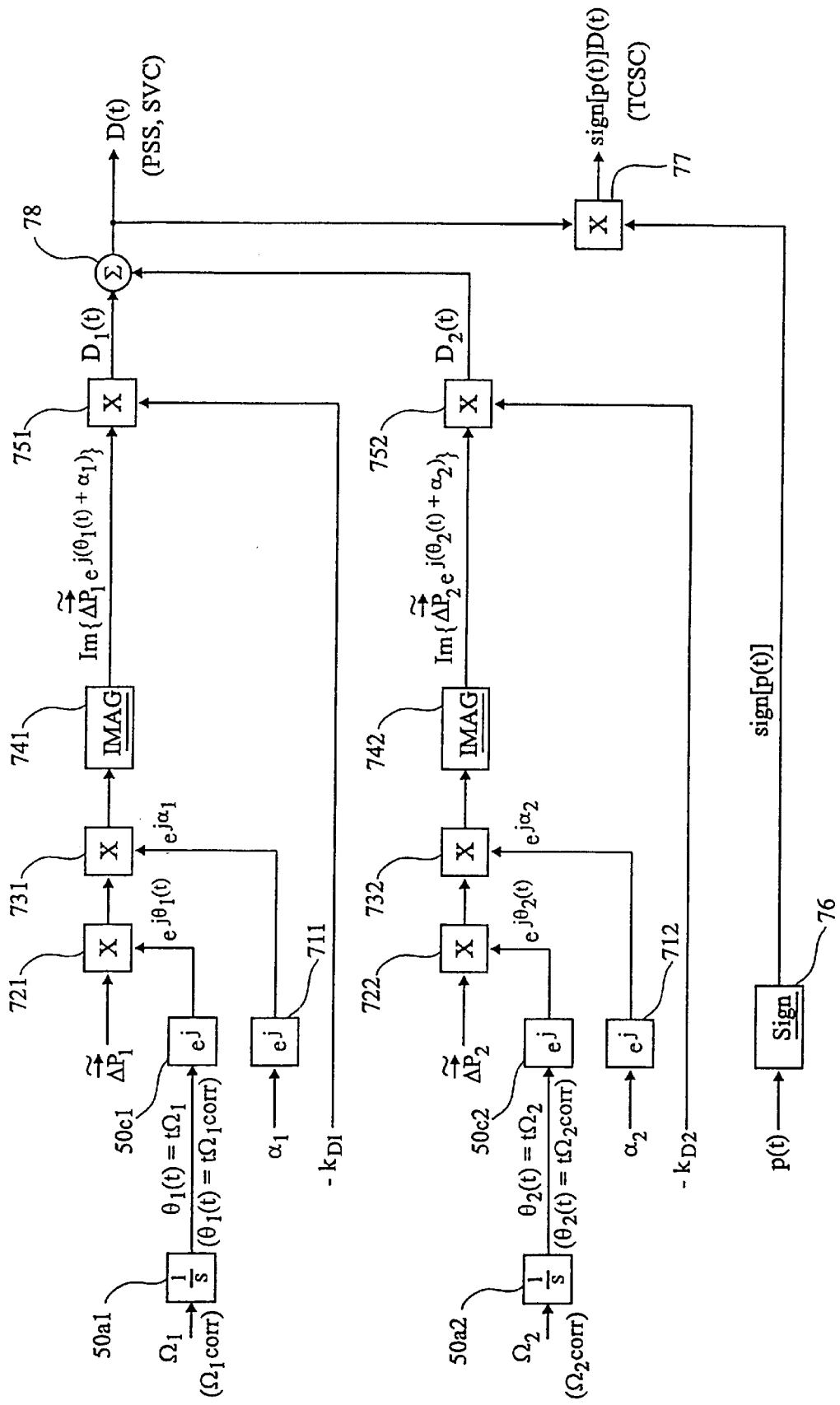
FIG. 12 shows a development of the invention for forming a control signal for damping power oscillations comprising two simultaneously oscillating components.

The expression (10) for the damping signal will in this case have the form $$D(t)=k_{D1}Re\{j\Delta\vec{P}_1 e^{j[\theta_1(t)+\alpha_1]}\}+k_{D2}Re\{j\Delta\vec{P}_2 e^{j[\theta_2(t)+\alpha_2]}\} \quad (17)$$

which, after expansion in a way similar to that in expression (10), will have the form as illustrated in FIG. 12, which is to compare with FIG. 7.

The members 50a1, 50c1 and 711–751 shown in FIG. 12 are of the same kind and correspond to the members 50a, 50c and 71–75 described with reference to FIG. 7 and are supplied with quantities corresponding to those which have been described with reference to FIG. 7 and which are to refer to the oscillation mode with an angular frequency $\Omega_1$.

The members 50a2, 50c2 and 712–752 shown in FIG. 12 are also of the same kind and correspond to the members 50a, 50c and 71–75 described with reference to FIG. 7 and are supplied with the corresponding quantities as described with reference to FIG. 7 and which are to refer to the oscillation mode with an angular frequency $\Omega_2$.

The output signal from the multiplying member 751 constitutes a damping signal $D_1(t)$ for damping the oscillation mode with an angular frequency $\Omega_1$ and the output signal from the multiplying member 752 constitutes a damping signal $D_2(t)$ for damping the oscillation mode with an angular frequency $\Omega_2$. The two damping signals $D_1(t)$ and $D_2(t)$ are supplied to a summing member 78, the output signal of which forms a resultant damping signal $D(t)$. The resultant damping signal may be processed and utilized as described above with reference to FIG. 7.

Also the frequency correction, described above, for adaptation of the frequency of the damping signal to the actual frequency of the real oscillation may be applied to this embodiment of the invention, in this case by an individual frequency correction for each one of the given expected frequencies. This extension of the frequency correction to comprise more than one frequency may, on the basis of the above description, be performed in a manner obvious to the person skilled in the art and will not therefore be described in greater detail in this context but is illustrated in FIGS. 11 and 12 with input signals $\Omega_{1corr}$ and $\Omega_{2corr}$ to the integrating members 50a1 and 50a2, respectively, put in parenthesis. The corresponding output signals from the integrating members, that is, the phase-reference signals $\theta_1(t)$ and $\theta_2(t)$, are also indicated in parenthesis.

Also the second embodiment of the invention, described above, may be formed to comprise simultaneous damping of several oscillation modes with different but given frequencies.

The expression (6) above may then be generalized to read $$p(t)=P_{av}+\Delta P_{x1}\cos\theta_1(t)-\Delta P_{y1}\sin\theta_1(t)+\Delta P_{x2}\cos\theta_2(t)-\Delta P_{y2}\sin\theta_2(t)$$

$$\Delta\vec{P}_1=\Delta P_{x1}+j\Delta P_{y1}$$

$$\Delta\vec{P}_2=\Delta P_{x2}+j\Delta P_{y2}$$

$$\theta_1(t)=\Omega_1 t$$

$$\theta_2(t)=\Omega_2 t$$

By a reasoning analogous to that which, on the basis of the expression (6), results in the expression (7), the corresponding regression vector will have the form $$p(t)=\phi^T(t)\Theta$$

$$\phi^T(t)=[1\ \cos\theta_1(t)\ -\sin\theta_1(t)\cos\theta_2(t)\ -\sin\theta_2(t)] \quad (19)$$

$$\Theta = \begin{bmatrix} P_{av} \\ \Delta P_{x1} \\ \Delta P_{y1} \\ \Delta P_{x2} \\ \Delta P_{y2} \end{bmatrix}$$

The expression (8) remains unchanged with the expression $\Theta$ according to the expression (9) replaced by the following relationship $$\tilde{\Theta} = \begin{bmatrix} \tilde{P}_{av} \\ \Delta\tilde{P}_{x1} \\ \Delta\tilde{P}_{y1} \\ \Delta\tilde{P}_{x2} \\ \Delta\tilde{P}_{y2} \end{bmatrix} \quad (20)$$

The invention is not limited to the embodiments shown but a plurality of modifications, which the person skilled in the art may carry out on the basis of the above description, are feasible within the scope of the claims. Thus, the power quantity, designated p(t) in the figures, used in the description and characterizing for the power, may be replaced by a corresponding current signal, in which case it should be taken into consideration that, if the damping equipment is to operate with oscillations intersecting the zero line, that is, the power changes direction, the signal shall be provided with signs which indicate the direction of the power transport in the transmission line to give a correct function for the damping equipment. Also other measurement signals may be useful for controlling damping equipment and may be utilized within the scope of the invention. In transmission lines with double parallel circuits, the total power signal for both circuits may be more suited for controlling the damping equipment than the power signal from one circuit only, since the damping equipment otherwise tends to move the power flow between the parallel circuits along the same transmission path.

What is claimed is:

1. A method of damping power oscillations in an electric transmission line of a power system transmitting power, comprising the steps of:

generating a first angular-frequency signal having a first angular frequency determined based on a prior knowledge of oscillation frequencies expected in the power system;

forming a first phase-reference signal being a time integral of the first angular-frequency signal;

sensing a power quantity in the electric transmission line as a sensed power quantity;

forming a first estimated power quantity corresponding to an oscillating component of the first angular frequency based on the sensed power quantity and having an amplitude and a phase position relative to the first phase-reference signal;

forming a first damping signal having an amplitude based on the amplitude of the first estimated power quantity and a phase shift relative to the phase position of the first estimated power quantity; and influencing an actuator with the first damping signal such that the power in the electric transmission line is influenced.

2. The method of claim 1, further comprising the steps of:

generating a second angular-frequency signal having a second angular frequency determined based on said prior knowledge of oscillation frequencies expected in the power system;

forming a second phase-reference signal being a time integral of the second angular-frequency signal;

forming a second estimated power quantity corresponding to an oscillating component of the second angular frequency based on the sensed power quantity and on an estimated value of the oscillating component of the first angular frequency, the oscillating component of the first angular frequency being superimposed on a mean power in the electric transmission line, the second estimated power quantity having an amplitude and a phase position relative to the second phase-reference signal; and forming a second damping signal having an amplitude based on the amplitude of the second estimated power quantity and a phase shift relative to the phase position of the second estimated power quantity, wherein the first estimated power quantity is based further on an estimated value of the oscillating component of the second angular-frequency, the oscillating component being superimposed on the mean power in the electric transmission line, and the influencing step comprises influencing an actuator with the first damping signal and the second damping signal such that the power in the electric transmission line is influenced.

3. The method of claim 2, further comprising the steps of:

supplying the sensed power quantity to a first filter device and a second filter device;

forming the first estimated power quantity as an output signal of the first filter device by signal processing the sensed power quantity and an estimated value of the mean power in the electric transmission line using low pass filters arranged in a cross-connection;

forming the estimated value of the mean power in the electric transmission line in the first filter device; and forming the second estimated power quantity in the second filter device as an output signal by signal processing the sensed power quantity and the estimated value of the mean power in the electric transmission line using low pass filters arranged in a cross-connection.

4. The method of claim 3, wherein:

the forming the estimated value of the mean power step includes producing the estimated value of the mean power from one of the low pass filters of the first filter device;

the forming the first estimated power quantity step includes producing the first estimated power quantity from another one of the low pass filters of the first filter device; and the forming the second estimated power quantity step includes producing the second estimated power quantity from a low pass filter of the second filter device.

5. The method of claim 1, further comprising the step of:

supplying the sensed power quantity to a first filter device;

signal processing the sensed power quantity and an estimated value of the mean power in the electric transmission line in the first filter device using low pass filters arranged in a cross-connection;

forming the estimated value of the mean power in the electric transmission line in the first filter device; and forming the first estimated power quantity as an output signal of the first filter device.

6. The method of claim 5, wherein:

the forming the estimated value of the mean power step includes producing the estimated value of the mean power from one of the low pass filters of the first filter device; and the forming the first estimated power quantity step includes producing the first estimated power quantity from another one of the low pass filters of the first filter device.

7. The method of claim 1, further comprising the step of:

supplying the sensed power quantity to a calculating device, wherein the calculating device is configured to form the first estimated power quantity using a recursive least-squares approach.

8. The method of claim 1, further comprising the step of:

forming a correction frequency signal for the first angular frequency based on an actual frequency of power oscillation when the amplitude of the first estimated power quantity exceeds a predetermined level.

9. The method of claim 8, wherein:

the first damping signal is deactivated if the correction frequency signal exceeds a first predetermined level, and the first damping signal is deactivated if the correction frequency signal falls below a second predetermined level.

10. The method of claim 1, wherein:

the forming a first damping signal step comprises forming a first damping signal having an amplitude based on an amplification factor which increases with an increase in the amplitude of the first estimated power quantity.

11. The method of claim 1, wherein:

the forming a first damping signal step comprises forming a first damping signal having a phase shift based on an estimated amplitude of a mean power in the electric transmission line.

12. The method of claim 1, wherein:

the influencing step comprises influencing magnetization equipment of a generator configured to deliver power to a power network based on the first damping signal.

13. The method of claim 1, further comprising the step of:

forming a reactance modulation signal based on the first damping signal and an instantaneous power-flow direction in the electric transmission line, wherein the influencing step comprises supplying the reactance modulation signal to a controllable series capacitor connected to the electric transmission line, the controllable series capacitor being the actuator.

14. The method of claim 1, further comprising the step of:

forming a voltage correction value based on the first damping signal, wherein the influencing step comprises supplying the voltage correction value to a static compensator for reactive power connected to the electric transmission line, the static compensator being the actuator.

15. A device for damping power oscillations in an electric transmission line of a power system transmitting power, comprising:
   a generation member configured to generate a first angular-frequency signal having a first angular frequency determined based on a prior knowledge of oscillation frequencies expected in the power system;
   a first phase-reference signal forming member configured to form a first phase-signal being a time integral of the first angular-frequency signal;
   a sensing member configured to sense a power quantity in the electric transmission line as a sensed power quantity;
   a first estimated power quantity forming member configured to form a first estimated power quantity corresponding to an oscillating component of the first angular frequency based on the sensed power quantity and having an amplitude and a phase position relative to the first phase-reference signal;
   a first damping signal forming member configured to form a first damping signal having an amplitude based on the amplitude of the first estimated power quantity and a phase shift relative to the phase position of the first estimated power quantity; and
   an actuator configured to be influenced by the first damping signal such that the power in the electric transmission line is influenced.

16. The device of claim 15, further comprising:
   a second generation member configured to generate a second angular-frequency signal having a second angular frequency determined based on said prior knowledge of oscillation frequencies expected in the power system;
   a second phase-reference forming member configured to form a second phase-reference signal being a time integral of the second angular-frequency signal;
   a second estimated power quantity forming member configured to form a second estimated power quantity corresponding to an oscillating component of the second angular frequency based on the sensed power quantity and on an estimated value of the oscillating component of the first angular frequency, the oscillating component of the first angular frequency being superimposed on a mean power in the electric transmission line, the second estimated power quantity having an amplitude and a phase position relative to the second phase-reference signal; and
   a second damping signal forming member configured to form a second damping signal having an amplitude based on the amplitude of the second estimated power quantity and a phase shift relative to the phase position of the second estimated power quantity, wherein
   the first estimated power quantity is based further on an estimated value of the oscillating component of the second angular-frequency, the oscillating component being superimposed on the mean power in the electric transmission line, and
   the actuator is configured to be influenced by the first damping signal and the second damping signal such that the power in the electric transmission line is influenced.

17. The device of claim 16, wherein:
   the first estimated power quantity forming member comprises a first filter device configured to form the first estimated power quantity as an output signal by signal processing the sensed power quantity and an estimated value of the mean power in the electric transmission line using low pass filters arranged in a cross-connection, the estimated value of the mean power in the electric transmission line being formed in the first filter device, and
   the second estimated power quantity forming member comprises a second filter device configured to form the second estimated power quantity as an output signal by signal processing the sensed power quantity and the estimated value of the mean power in the electric transmission line using low pass filters arranged in a cross-connection, the estimated value of the mean power in the electric transmission line being formed in the first filter device.

18. The device of claim 17, wherein:
   the first estimated power quantity is produced from one of the low pass filters of the first filter device;
   the estimated value of the mean power is produced from another one of the low pass filters of the first filter device; and
   the second estimated power quantity is produced from a low pass filter of the second filter device.

19. The device of claim 15, wherein:
   the first estimated power quantity forming member comprises a first filter device configured to form the first estimated power quantity as an output signal by signal processing the sensed power quantity and an estimated value of the mean power in the electric transmission line using low pass filters arranged in a cross-connection, the estimated value of the mean power in the electric transmission line being formed in the first filter device.

20. The device of claim 19, wherein:
   the first estimated power quantity is produced from one of the low pass filters of the first filter device; and
   the estimated value of the mean power is produced from another one of the low pass filters of the first filter device.

21. The device of claim 15, wherein:
   the first estimated power quantity forming member comprises a calculating device configured to receive the sensed power quantity and to form the first estimated power quantity using a recursive least-squares approach.

22. The device of claim 3, further comprising:
   a correction frequency forming member configured to form a correction frequency signal for the first angular frequency based on an actual frequency of power oscillation when the amplitude of the first estimated power quantity exceeds a predetermined level.

23. The device of claim 15, further comprising:
   a deactivation member configured to deactivate the first damping signal if the correction frequency signal exceeds a first predetermined level and to deactivate the first damping signal if the correction frequency signal falls-below a second predetermined level.

24. The device of claim 15, wherein:
   the first damping signal forming member is configured to form a first damping signal having an amplitude based on an amplification factor which increases with an increase in the amplitude of the first estimated power quantity.

25. The device of claim 15, wherein:
   the first damping signal forming member is configured to form a first damping signal having a phase shift based on an estimated amplitude of a mean power in the electric transmission line.

26. The device of claim 15, wherein:

the actuator comprises magnetization equipment of a generator configured to deliver power to a power network based on the first damping signal.

27. The device of claim 15, further comprising:

a reactance modulation signal forming member configured to form a reactance modulation signal based on the first damping signal and an instantaneous power-flow direction in the electric transmission line, wherein the actuator comprises a controllable series capacitor connected to the electric transmission line, a control signal of the controllable series capacitor being the reactance modulation signal.

28. The device of claim 15, wherein:

the actuator comprises a static compensator for reactive power connected to the electric transmission line.

* * * * *